United States Patent
Seeger et al.

(10) Patent No.: US 7,123,292 B1
(45) Date of Patent: Oct. 17, 2006

(54) MOSAICING IMAGES WITH AN OFFSET LENS

(75) Inventors: Mauritius Seeger, Royston (GB); Christopher R. Dance, Trumpington (GB); Stuart A. Taylor, Cambridge (GB); William M. Newman, Cambridge (GB); Michael J. Flynn, Milton (GB)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/408,873

(22) Filed: Sep. 29, 1999

(51) Int. Cl.
*H04N 5/225* (2006.01)
*G02B 13/16* (2006.01)

(52) U.S. Cl. .................... 348/218.1; 348/335; 348/373

(58) Field of Classification Search ................. 359/381, 359/201, 202, 200, 210; 348/195, 202, 218.1, 348/335, 340, 343, 344, 360, 361, 369, 373, 348/375, 219.1, 47, 48; 358/497
See application file for complete search history.

(56) References Cited

U.S. PATENT DOCUMENTS

| | | | | |
|---|---|---|---|---|
| 4,751,570 A * | 6/1988 | Robinson | ................... | 348/47 |
| 5,339,188 A * | 8/1994 | Fritzel | ...................... | 359/200 |
| 5,453,784 A * | 9/1995 | Krishnan et al. | ........... | 348/348 |
| 5,511,148 A | 4/1996 | Wellner | ..................... | 395/106 |
| 5,528,290 A * | 6/1996 | Saund | ..................... | 348/218.1 |
| 5,557,327 A * | 9/1996 | Hasegawa et al. | ........... | 348/340 |
| 5,561,460 A * | 10/1996 | Katoh et al. | .............. | 348/219.1 |
| 5,656,078 A * | 8/1997 | Fuerhoff | .................... | 117/201 |
| 5,686,960 A * | 11/1997 | Sussman et al. | .......... | 348/218.1 |
| 5,705,806 A | 1/1998 | Matsuda et al. | .......... | 250/208.1 |
| 5,774,179 A * | 6/1998 | Chevrette et al. | ......... | 348/218.1 |
| 5,978,143 A * | 11/1999 | Spruck | ...................... | 359/619 |
| 6,005,682 A | 12/1999 | Wu et al. | ................... | 358/474 |
| 6,067,112 A * | 5/2000 | Wellner et al. | ........... | 348/211.4 |
| 6,072,529 A * | 6/2000 | Mutze | ........................ | 348/351 |
| 6,104,840 A * | 8/2000 | Ejiri et al. | ................... | 382/284 |
| 6,137,535 A * | 10/2000 | Meyers | ....................... | 348/340 |
| 6,256,058 B1 * | 7/2001 | Kang et al. | ............. | 348/207.99 |
| 6,493,469 B1 * | 12/2002 | Taylor et al. | ................ | 382/284 |
| 6,583,811 B1 * | 6/2003 | Kinjo | ........................... | 348/96 |
| 6,657,667 B1 * | 12/2003 | Anderson | .............. | 348/333.12 |
| 6,686,956 B1 * | 2/2004 | Prakash et al. | ........... | 348/218.1 |

OTHER PUBLICATIONS

Canon Camera Lens Product Description published on Internet @ http://www.usa.canon.com/camcambin/cameras/lenses.html.
Canon EF Mount TS-E 24mm f/3.5L published on Internet @ http://www.canon.co.jp/camera-museum/lens/ef/ts_e24_35.html.
Canon EF Mount Block diagram of TS-E24mm F3.5L published on Internet @ http://www.canon.co.jp/camera-museum/lens/ef/ts_e24_35k.html.
Zappala, T., Gee, A., and Taylor, M., "Document mosaicing," Proceedings of British Machine Vision Conference, BMVC-97, Essex, England, Sep. 1997, Ed. A. F. Clark, pp. 600-609.

* cited by examiner

*Primary Examiner*—Vivek Srivastava
*Assistant Examiner*—Justin Misleh (57) ABSTRACT

A camera can be used to record multiple low resolution images of an object by shifting a camera lens relative to an image sensor of the camera. Each camera image recorded represents a portion of the object. A composite high resolution image of the object can be obtained by patching together the camera images by using various well known mosaicing, tiling, and/or stitching algorithms.

12 Claims, 12 Drawing Sheets

MOSAICING IMAGES WITH AN OFFSET LENS

FIELD OF THE INVENTION

The present invention relates to an image acquisition system, and more specifically to an apparatus and method of scanning using one or more cameras.

BACKGROUND OF THE INVENTION

Recent developments in "over-the-desk" scanning take advantage of combining the functionality of traditional paper scanning devices with that of a digital camera. Over-the-desk scanning generally refers to capturing images of hardcopy documents positioned on a desktop with a camera positioned above the desktop. These captured images are digitized for further processing and then displayed on a computer monitor. An example of such an over-the-desk scanning system is disclosed by Wellner in U.S. Pat. No. 5,511,148 entitled "Interactive Copying System."

Over-the-desk scanning has many advantages over traditional scanning methods using devices such as flat-bed scanners, sheet-feed scanners and hand-held scanners that use contact scanning to reproduce high resolution images of documents. In general, contact scanning is limited to the scanning of flat objects, such as documents, and is often considered cumbersome to use because the document must be moved from its place of reading or the scanner must be moved relative to the document for scanning.

One advantage of over-the-desk scanning versus traditional contact scanning is that of convenience because documents are not required to be moved from their usual place of reading. This encourages a more casual type of scanning where the user is able to scan small amounts information from a document as it is encountered while reading, rather than making a note of its position in a document for scanning at a later time.

A second advantage is that the non-contact nature of the over-the-desk scanning allows the capture of three-dimensional (3D) objects in addition to capturing two-dimensional (2D) objects. Thus, human gestures, as well as physical media, may be captured by the over the desk scanning. For example, a pointing finger may be used to annotate a hardcopy document captured by the camera.

Although the use of video cameras to scan objects provides many advantages over traditional scanning methods, the use of cameras for document scanning is often limited by the resolution of the camera. Low resolution cameras typically do not yield images with sufficient quality to enable successful document decoding using optical character recognition (OCR). For example, an OCR error rate under 1% may be achieved for 10-point Times Roman text, scanned with a video camera by applying carefully created binarisation algorithms to camera images acquired at such low resolutions as 100 dots per inch (dpi). Below this resolution, the error rate and the time to recognize a page increases rapidly. Furthermore, high resolution cameras are often not cost effective for an over-the-desk scanning system.

Various approaches have been used to improve low-resolution camera images. One technique, referred to as "super-resolution", combines information from several low resolution images to create a higher resolution image of a source document. Each low-resolution image is shifted a small amount (i.e., of the order of a pixel). Such small scale shifting requires a precise small-scale translation device, or alternatively, a method to infer random movements using only the images themselves, with sub-pixel precision. In addition to requiring a large number of images, super-resolution is considered computationally expensive and difficult to implement. Furthermore, this technique does not fully overcome the problem of camera blur.

A second approach often referred to as "mosaicing", "tiling" or "stitching" patches together several smaller low-resolution images to create a larger image having a higher resolution image. In general, mosaicing techniques are easier to implement than super-resolution techniques and also yields an increased resolution that is roughly proportional to the square root of the number of images in the mosaic.

When mosaicing, the smaller low-resolution images may be obtained in a number of ways. For example, the camera may be moved relative to the large imaging area. The camera may be moved by the user or automatically moved by a translation device. Unfortunately, if the camera is panned and/or tilted, perspective distortions often need to be corrected.

Alternatively, mosaicing may be performed by moving the object to be imaged (e.g., document) with respect to the camera. This type of mosaicing is only feasible when the object can be easily moved. When used for scanning documents, this method requires non-intuitive and inconvenient interaction with the user, who must move his document so that all parts of it may be seen by the camera.

However, these two types of mosaicing often result in transforming images by scaling, rotation or non-linear warping relative to each other. Subsequently, detection or calibration of the transformations and restoring the images to their undistorted coordinates are required to be performed before mosaics can be obtained. Not only are these operations computationally intensive but also may degrade the quality of the images.

A third type of mosaicing can be achieved by moving the image sensor of the camera in a plane parallel to the image plane. This generally involves extensive modification or retro-fitting of an existing consumer-level camera or a customized camera in order to mount the image sensor on a two-axis translation device. The inability to use commercially available consumer-level video cameras is likely to increase the cost of an over-the-desk scanning system.

Thus, under certain circumstances, it would be desirable to increase the resolution of the camera images recorded by consumer-level video cameras using a mosaicing technique with only minimal modifications to an existing consumer-level video camera. Such an approach is likely to enhance the quality of over-the-desk scanning images while maintaining the cost feasibilty of an over-the-desk scanning system.

SUMMARY OF THE INVENTION

It is an object of the present invention to enable document capture using one or more low resolution video cameras.

It is also an object of the present invention to provide a camera system that can efficiently record multiple views of an area having one or more objects.

A camera system is described. The camera system includes an image sensor and a lens. The image sensor includes a relatively planar surface for detecting light rays originating from an area having a plurality of views. The area may include one or more 2D and/or 3D objects. The lens is positioned at a plurality of predetermined offset positions within a lens plane. The lens plane is located substantially orthogonal to an optical axis of the lens. The image sensor detects light rays originating from one of the plurality of views when the lens is positioned at one of the predetermined offset positions.

An image acquisition system is also described. The image acquisition system includes a camera system coupled to an image processing system. The camera system records a plurality of camera images by shifting a camera lens in a plane substantially orthogonal to the optical axis of the camera lens. Each camera image recorded represents one of a plurality of views within an area. The area may include one or more 2D and/or 3D objects. The image processing system combines the plurality of camera images to produce a composite image of the area having a higher resolution than one or more of the camera images.

An image acquisition system having a plurality of cameras is also described. The plurality of cameras records multiple views of an area. The area may include one or more 2D and/or 3D objects. Each camera records one or more views to produce the camera images of the views. One or more of the cameras includes an offset lens to produce an oblique field of view.

Additionally, a method of scanning with a camera system is described. A first view of an area having one or more objects is captured while a lens is positioned at a first position within a plane substantially orthogonal to an optical axis of the lens. A next view of the area is captured while the lens is positioned at a next position within the plane until all views are recorded. All recorded views are combined to produce a composite image having a higher resolution than one or more of the recorded views.

A method of scanning with a camera system having a plurality of cameras is also described. A plurality of views of an area having one or more objects is recorded with a plurality of cameras. Each camera has its lens positioned within a plane substantially orthogonal to the optical axis of its camera. One or more cameras includes an offset lens. All recorded views are combined to produce a composite image having a higher resolution than one or more of the recorded views.

Another method of scanning with a camera is described. A first view of an area having one or more objects is recorded while the lens is positioned at an offset position within a plane substantially orthogonal to an optical axis of the lens while the camera is at a first position. A next view of the area is recorded while the lens is positioned at the offset position within the plane after the camera is rotated to a next position until all views of the area are recorded. All recorded views are combined to produce a composite image having a higher resolution than the resolution of one or more of the recorded views.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION OF THE INVENTION

A camera can be used to record multiple low resolution images of an object by shifting a camera lens in a plane which is substantially orthogonal to an optical axis of the camera lens and/or substantially parallel to an image sensor of the camera. Each camera image recorded represents a portion of the object. A composite high resolution image of the object suitable for OCR can be obtained by patching together the camera images by using various well known mosaicing, tiling, and/or stitching algorithms. Optical character recognition (OCR) may be performed on the composite high resolution image to translate the bitmap image captured by the camera into computer text with a reliable or acceptable OCR error rate.

Figure 1:
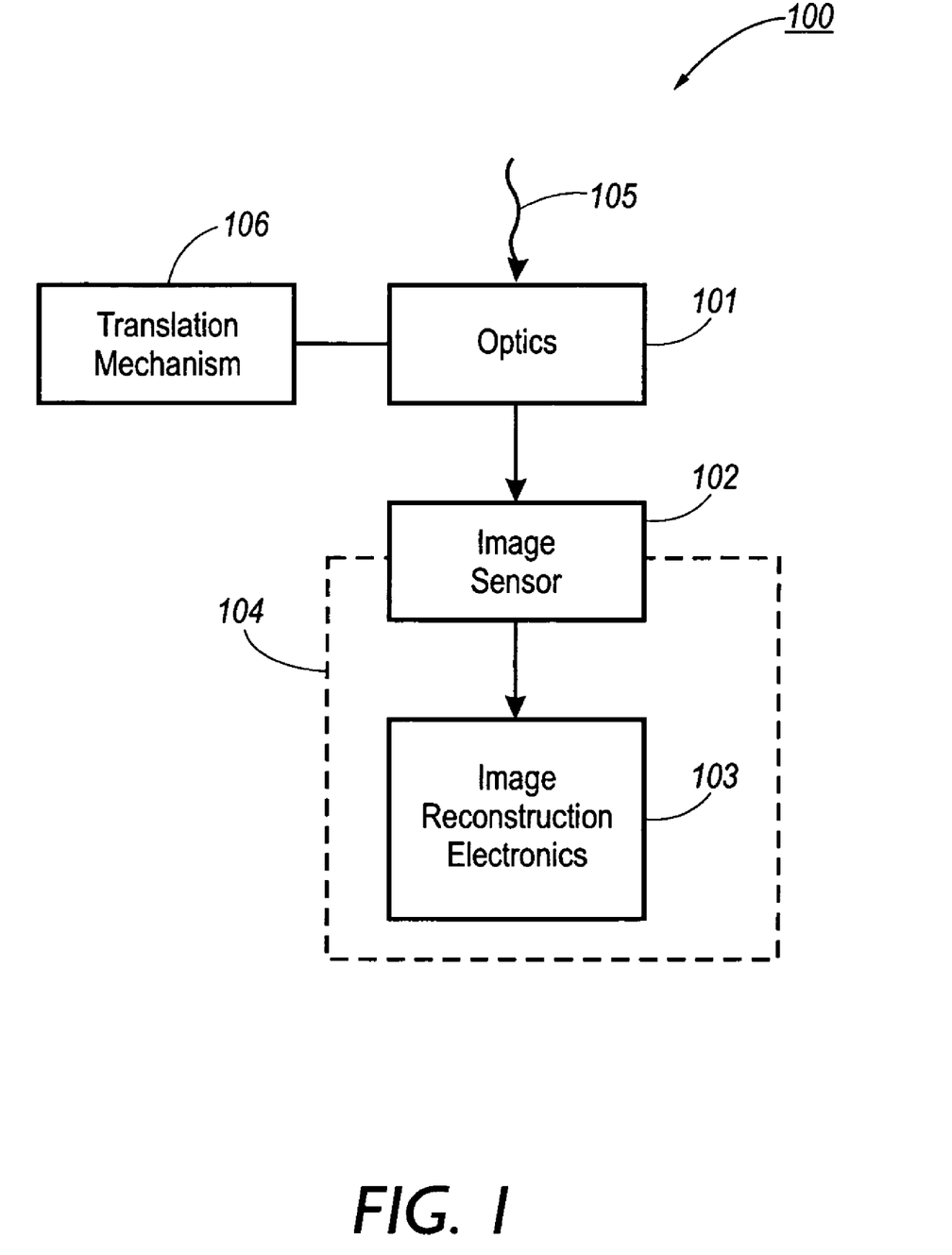
FIG. 1 illustrates a camera system according to one embodiment of the present invention.

FIG. 1 illustrates a block diagram of a Camera 100 according to one embodiment of the present invention. The camera 100 may be a still or video camera for capturing 2D images or a line-scan camera for capturing scan lines with a 1D sensor. Additionally, Camera 100 may represent photographic film cameras, point sensors, or scanning devices (i.e., one or two axis mirrors with point sensor). Light Rays represented by an arrow 105 pass through Optics 101 to form an image on an Image Sensor 102. Light rays 105 represent the light rays originating from an object of interest, which may include two and/or three dimensional objects.

The Optics 101 forms an image on Image Sensor 102. If the area over which an undistorted detectable image is formed by Optics 101 is larger than the area of Image Sensor area 102, then the image region detected by Image Sensor 102 can be shifted (i.e., offset from the optical axis of Optics 101) by moving Optics 101 in a plane which is substantially orthogonal to an optical axis of Optics 101 and/or substantially parallel to Image Sensor 102. Depending upon the size of Optics 101 and Image Sensor 102, the image of the object of interest can be much larger than the size of Image Sensor 102. By moving Optics 101 in this manner, different parts of the image formed by Optics 101 can be made to overlap with Image Sensor 102, yielding a total field of view much wider than that supported by the area of Image Sensor 102.

For one embodiment of the present invention, Optics 101 is a 35 mm SLR objective lens. In general, Optics 101 represents a camera lens, which includes a single lens or a combination of lenses. For convenience, the term lens will be used to refer to a camera lens.

For one embodiment of the present invention, the surface of Image Sensor 102 receiving the light rays is substantially orthogonal to the line joining the centers of curvature of the lens surfaces. This line is known as the optical axis. The Optics 101 and Image Sensor 102 may or may not be positioned in substantially parallel planes. When the planes are parallel, they are formed by the same two axes and separated by a distance. For convenience, these two axes may be referred to as the x-axis and the y-axis; however, it should be noted that the present invention is not limited to the x and y axes.

Figure 2:
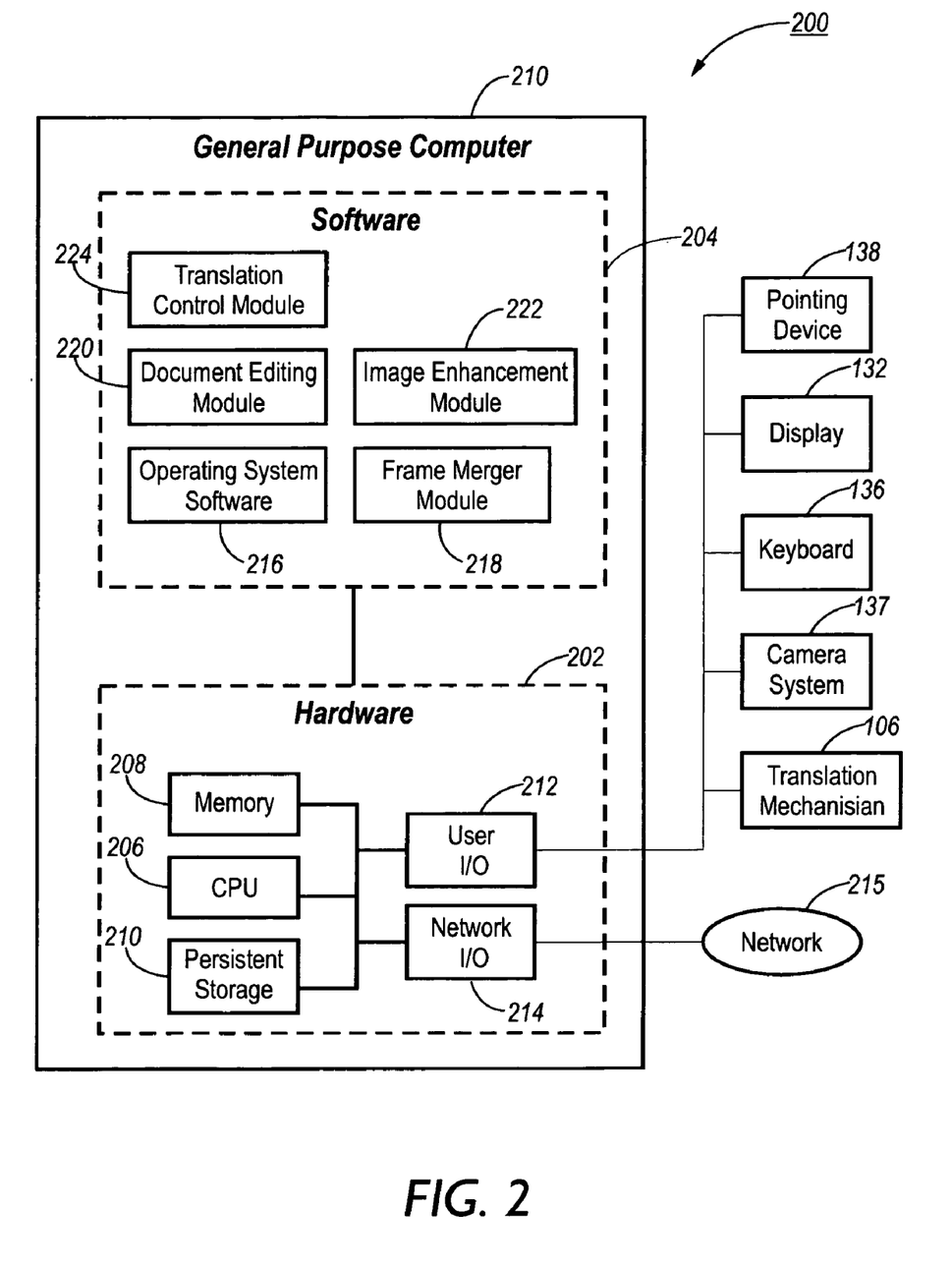
FIG. 2 illustrates an image acquisition system according to one embodiment of the present invention.

The Image Sensor 102 converts the light rays it detects into electrical signals for image processing by an Image Reconstruction Electronics 103 and/or an image processing system such as General Purpose Computer 210 shown in FIG. 2. The image formed on Image Sensor 102 is dependent upon the field of view covered by Optics 101. When Optics 101 is positioned directly below Image Sensor 102 (e.g., an optical axis of Optics 101 is normal to Image Sensor 102 and passes through a centroid of Image Sensor 102), also referred to as the "center position," then Camera 100 has a direct field of view. However, when Optics 101 is laterally displaced or offset from the center position in a plane orthogonal to the optical axis and/or parallel to Image Sensor 102, then Camera 100 has a shifted field of view. The amount that Lens 101 is offset from the center position is dependent upon the distance the lens is above area to be viewed and the focal lengths of the lens and the distance between the lens and the image sensor.

For one embodiment of the present invention, Image Sensor 102 is a charge coupled device (CCD) in the form of an array ("array sensor") or alternatively, in the form of line ("linear sensor"). Alternatively, technologies other than CCD, such as a complementary metal-oxide semiconductor ("CMOS") technologies may be used for Image Sensor 102. In general, Image Sensor 102 may represent various types of light sensitive sensors including, but not limited to, photographic film, various types of photodetectors, array of photodiodes or array of any type of point detector, single point detectors, video tubes or scanning devices.

Image Reconstruction Electronics 103 generally digitizes the camera signals and reformats the data into signals and timing that are consistent with transmission and display requirements. Camera Housing 104 fully encloses Image Reconstruction Electronics 103 and partially encloses Image Sensor 102. The sensors of Image Sensor 102 are exposed from Camera Housing 104 in order to detect light rays directed from Optics 101.

Figure 9:
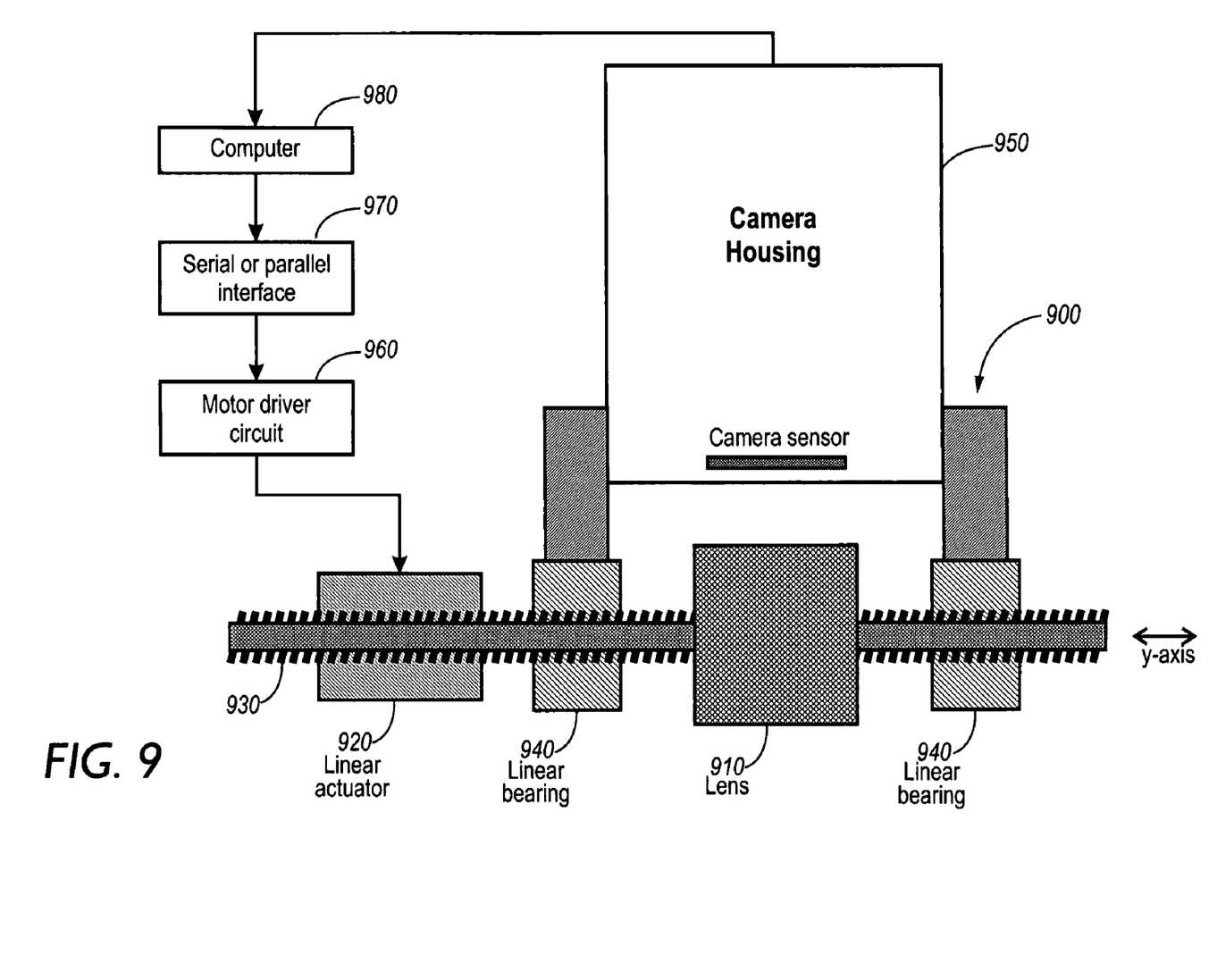
FIG. 9 illustrates a one-dimensional translation mechanism according to one embodiment of the present invention.

A Translation Mechanism 106 is used to shift Optics 101 along one or two axes such as the x-axis and/or the y-axis in order to capture multiple views of an image area of interest. For one embodiment of the present invention, the movement of Translation Mechanism 106 is electronically controlled. For example, Translation Mechanism may be a two axis translation stage with computer controlled linear actuators. FIG. 9 illustrates one example of a type of Translation Mechanism 106 that may be used for a one axis optics translation.

By using Translation Mechanism 106 to move Optics 101 in a plane orthogonal to the optical axis and/or parallel to Image Sensor 102, images of different parts of an area of interest can be obtained in a controlled fashion. The Translation Mechanism 106 can be controlled by a computer to allow precise positioning in a single axis or two axes. The resulting camera images recorded at different lens positions can then be efficiently stitched to form a mosaic image of a much larger size.

Translating the lens formed by Optics 101 in a plane orthogonal to the optical axis and/or parallel to Image Sensor 102 is very nearly equivalent to a motion of an image sensor with a fixed lens. This type of pure translational shift does not introduce optical aberrations in addition to the aberration present in the normal function of the lens. However, although most lenses form an image that is larger than Image Sensor 102 intended for, optical aberrations tend to be present at the borders of these images. In order to obtain a high quality image over a larger area, it is possible to replace the standard lens with one intended for a larger sensor area. For example, a 35 mm SLR camera lens in conjunction with a 5×5 mm Image Sensor 102, can record a low distortion image over an area $(35/5)\times(35/5)=49$ times larger than normally seen using Camera 100.

For one embodiment of the present invention, Camera 100 is a standard off-the-shelf consumer-level video camera such as a SONY DFW-V300, having slight modifications to enable Optics 101 to move relative to Image Sensor 102. Consumer-level video cameras generally refer to commercially available video cameras having a resolution (i.e., pixel count in the horizontal and vertical directions) between the range of 640×480 and 1280×960 sold to the general public at a modest price. A standard video camera can be modified to include a lens moving mechanism (i.e., Translation Mechanism 106) and the necessary circuitry and/or software to control the lens movement. Additionally, Camera 100 may even include circuitry and/or software to stitch the camera images to form a mosaic.

FIG. 2 illustrates an Image Acquisition System 200 according to one embodiment of the present invention suitable for mosaicing camera images. For one embodiment of the present invention, Image Acquisition System 200 includes a General Purpose Computer 210 for performing image processing. The Hardware Components 202 include a Processor (i.e., CPU) 206, Memory 208 (ROM, RAM, etc.), Persistent Storage 210 (e.g., CD-ROM, hard drive, floppy drive, tape drive, etc.), User I/O 212, and Network I/O 214. The User I/O 212 can include a Keyboard 136, a Pointing Device 138 (e.g., pointing stick, mouse, etc.), a Display 132, a Camera System 137 representing one or more video cameras, and a Translation Mechanism 106. The Network I/O 214 is a communications gateway to a Network 215 such as, a LAN, WAN, or the Internet.

The Software Modules 204 of General Purpose Computer 210 includes an Operating System 216 and various Application programs such as a Frame Merger Module 218, a Document Editing Module 220, and an Image Enhancement Module 222. The Operating System 216 permits Processor 206 to control the various hardware devices such as Camera System 137 and Display 132.

A Frame Merger Module 218 is adapted to stitch together multiple views of an image area of interest recorded by Camera System 137 for viewing on Display 132. Subsequently, if desired, the composite image generated by Frame Merger Module 218 can be enhanced or edited by invoking an Image Enhancement Module 222 or a Document Editing Module 220, respectively. For one embodiment of the present invention, Translation Mechanism 106 is controlled by a Translation Control Module 224. Alternatively, Translation Mechanism 106 may be controlled by hardware such as control circuitry (not shown).

It will be appreciated by those skilled in the art that General Purpose Computer 210 can be defined by any one of a plurality of configurations. For example, Processor 206 may in alternative embodiments, be defined by a collection of microprocessors configured for multiprocessing. In yet other embodiments, the functions provided by Software Modules 204 may be distributed across multiple computers acting together as a single processing unit. Furthermore, one or more aspects of the various Software Modules 204 may be implemented in hardware, rather than software. For additional embodiments, the image processing by General Purpose Computer 210 may be implemented in other data processing devices. For example, mosaicing image with an offset lens may be implemented in hardware and/or software in a portable device, such as a document camera (i.e., a camera system capable of performing image processing).

Figure 3A:
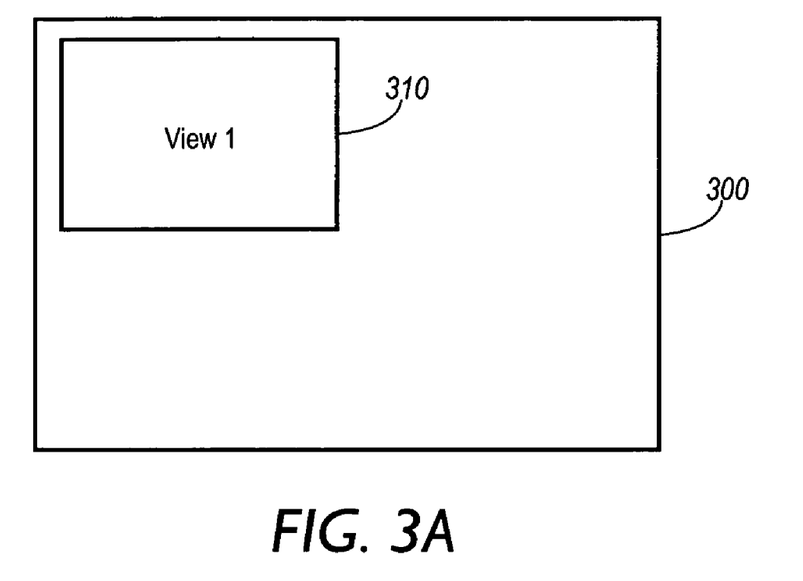
FIGS. 3A–B illustrate various views of an area of interest visible to a video camera.
Figure 3B:
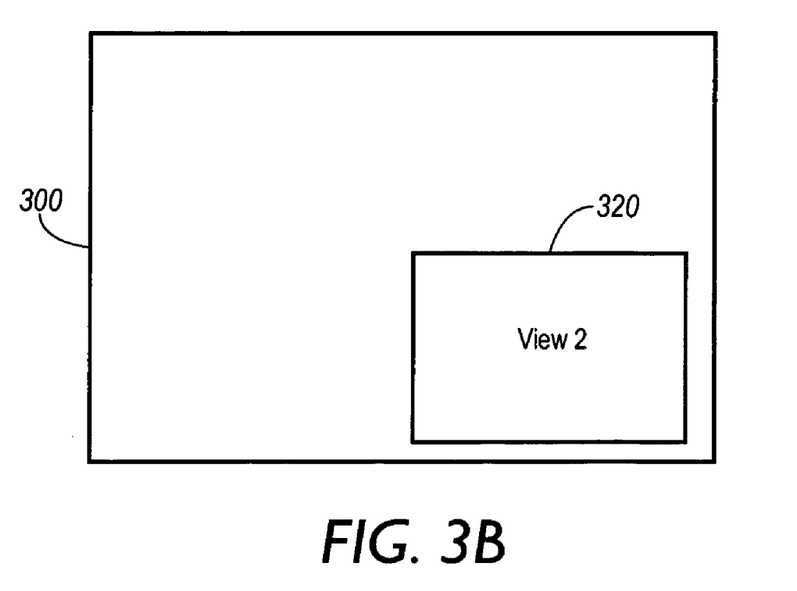

FIGS. 3A, 3B, 4A and 4B illustrate one embodiment of the present invention that is implemented with a video camera having an array sensor. FIGS. 3A and 3B illustrate the relative size and position of various views within an Area of Interest 300 visible to a camera. Each of the views 310 and 320 represent a portion of Area of Interest 300 (also referred to as a tile or mosaic), which can be recorded within a frame. The Area of Interest 300 may include various types of 2D objects such as a document page, a portion of a document page, or any other media including text and/or graphics, located on a desktop, whiteboards, or other surface and/or various types of 3D objects such as a human hand.

FIG. 3A illustrates a view (shown as view 1) of the upper left hand region of Area of Interest 300 and FIG. 3B illustrates a view (shown as view 2) of the lower right hand region of Area of Interest 300.

According to FIGS. 3A and 3B, Area of Interest 300 is much larger than an image recorded by the camera (also referred to as a "camera image"). Thus, in order to capture the entire Area of Interest 300, several overlapping smaller views of the Area of Interest 300 must be recorded by the camera. This can be accomplished by positioning the camera lens at a plurality of predetermined offset positions. At each predetermined offset position, the camera records an image of one of the views. The region of overlap between the smaller camera images allow them to be patched together to form a composite image in accordance with various known tiling, mosaicing, and/or stitching algorithms. For example the stitching algorithm described in Zappala, T., Gee, A., and Taylor, M., "Document mosaicing," Proceedings of British Machine Vision Conference, BMVC-97, Essex, England, September 1997, Ed. A. F. Clark, pp. 600–609, may be used.

Figure 3C:
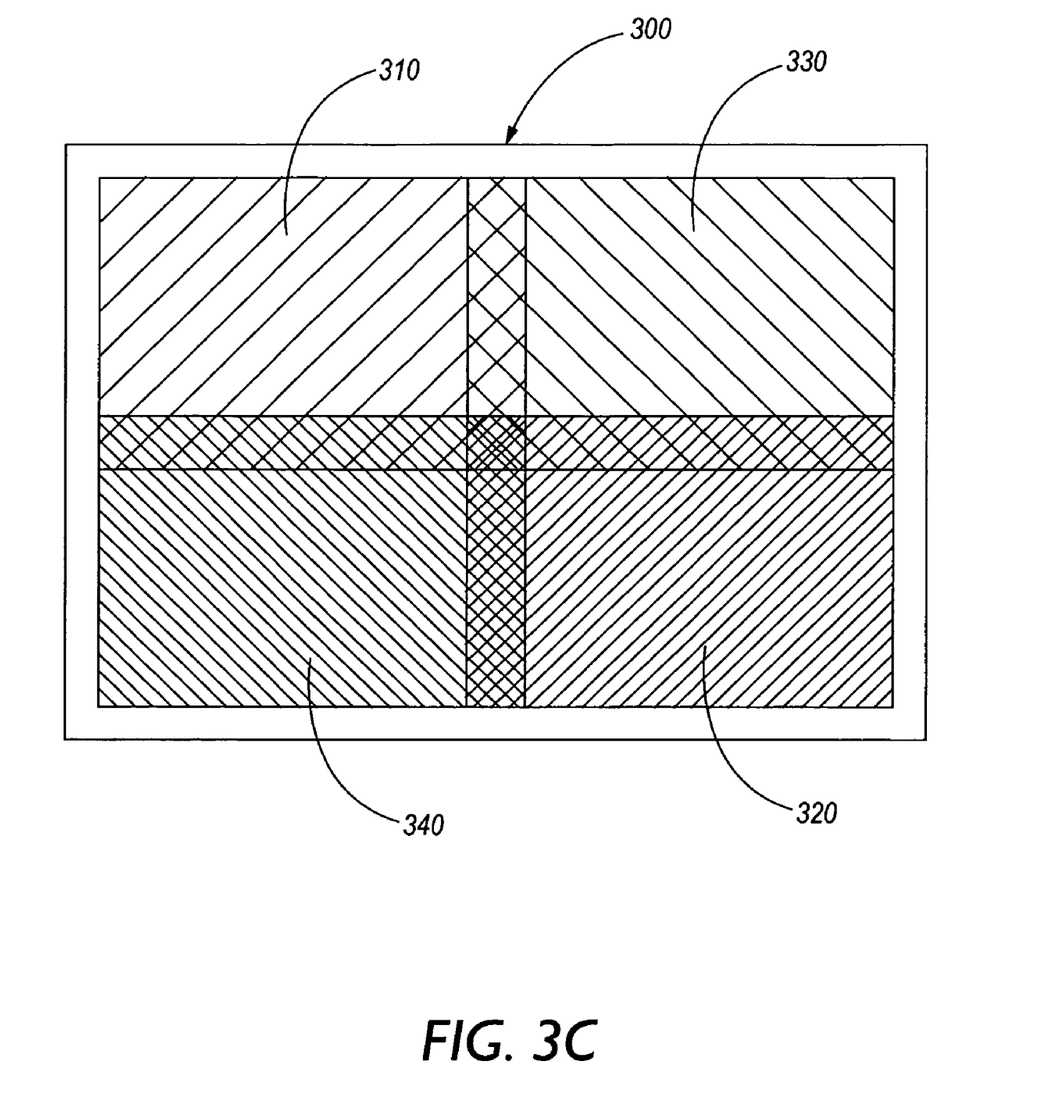
FIG. 3C illustrates four overlapping regions of an area of interest.

For this example, it should be noted that in order for the video camera to fully capture Area of Interest 300, four views should be recorded because each view roughly represents a quadrant of Area of Interest 300. All four views (310, 320, 330 and 340) are shown in FIG. 3C.

The advantage of stitching together several smaller images to form a composite image is that the resolution of Area of Interest 300 can be improved for more accurate document image decoding by OCR, improved legibility or improved quality of pictures on a page.

Figure 10:
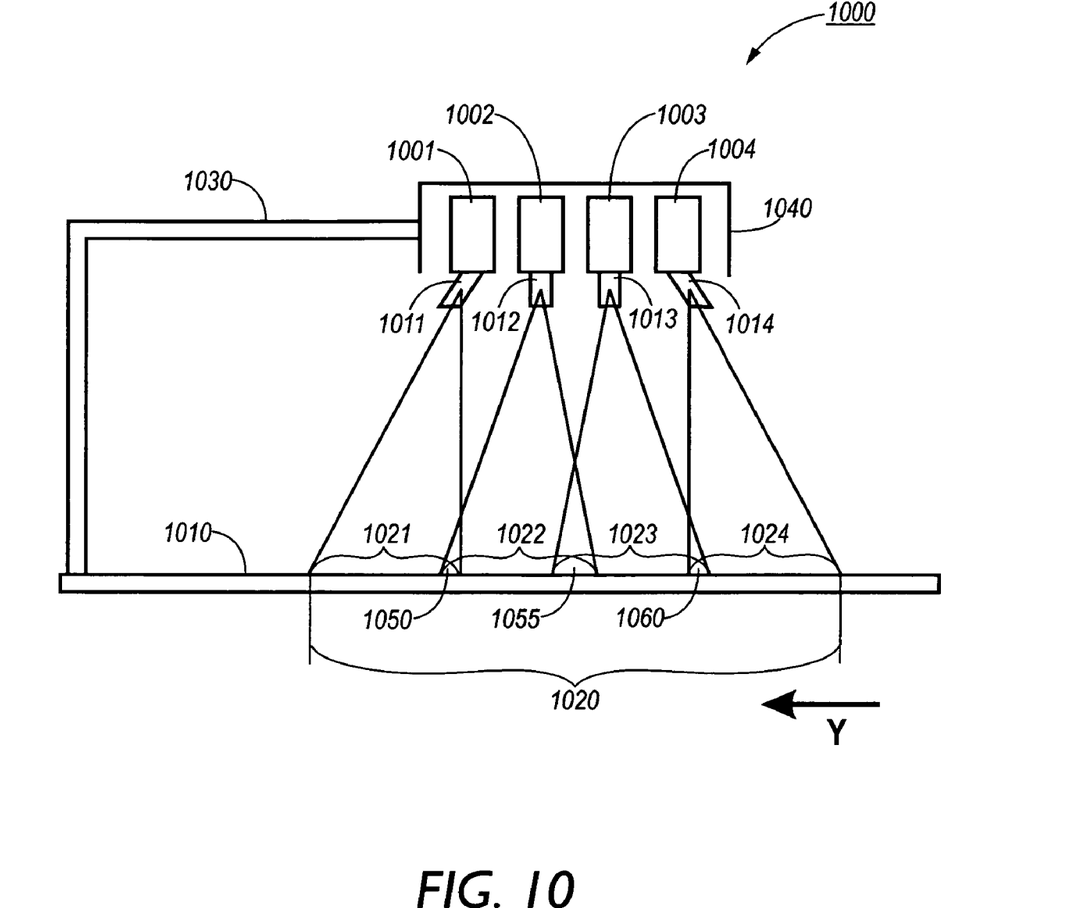
FIG. 10 illustrates multiple cameras arranged to view a large image area of interest according to one embodiment of the present invention.

It should be noted that for alternative embodiments of the present invention, a driving mechanism for translating the lens is optional. For example, rather than shifting the lens to capture the various offset views of the area of interest, a multiple camera system may be used. In a multiple camera system, each camera is positioned and configured to view a portion (e.g., quadrant) of the area of interest. Although the lens may be offset from the image sensor in one or more of the cameras, the lens may not need to be translated because it remains at that fixed offset. FIG. 10 which illustrates an example of a multiple camera system according to one embodiment of the present invention will be discussed in more detail below.

Figure 4A:
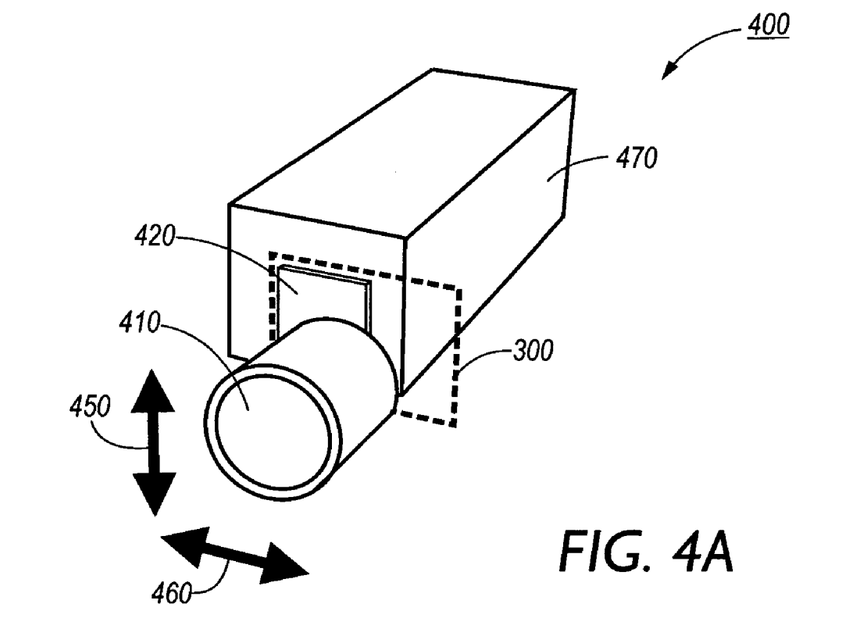
FIGS. 4A–B illustrate perspective views of a video camera system according to one embodiment of the present invention positioned to record various views of an area of interest.
Figure 4B:
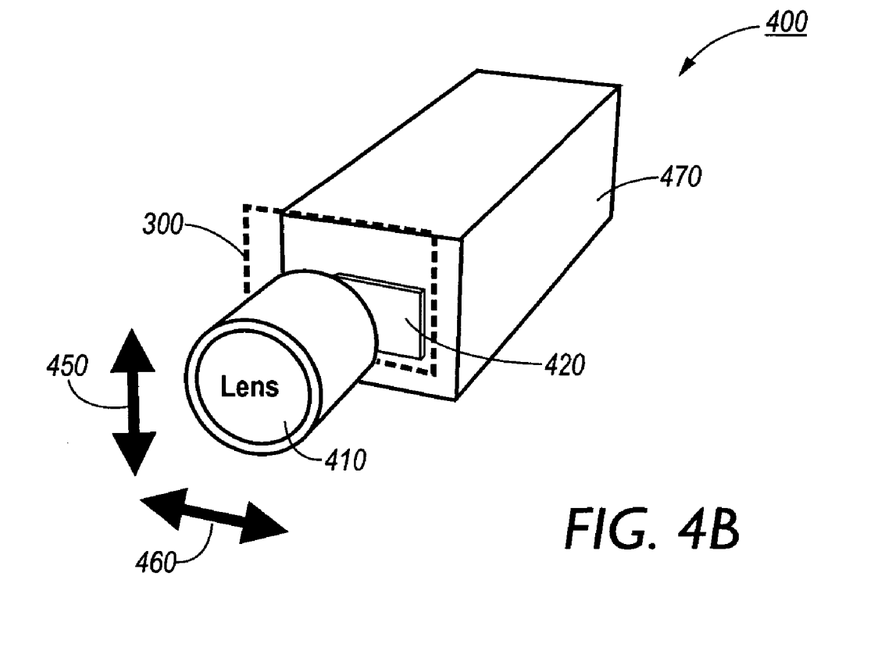

FIGS. 4A and 4B illustrate a perspective view of a Video Camera 400 which illustrates how a translation mechanism (not shown) may position Lens 410 with respect to Array Sensor 420 to capture multiple views of Area of Interest 300. The Lens 410 is positioned at a first offset position in FIG. 4A and a second offset position in FIG. 4B. For one embodiment of the present invention, Array Sensor 420 is an integral part of camera 400 whereas Lens 410 is detachable from Camera 400.

For various embodiments of the present invention, Lens 410 is positionable within a plane, which is orthogonal to the optical axis of Lens 410. For preferred embodiments of the present invention, Array Sensor 420 and Lens 410 are also positioned in parallel planes formed by two axes, which are separated by a distance along the a third axis. For one embodiment of the present invention, Array Sensor 420 is located in a first x-y plane and Lens 410 is located in a second x-y plane (also referred to as a lens plane) such that Lens 410 and Array Sensor 420 are separated by a distance D along the z-axis. For one embodiment of the invention, Lens 410 and Array 420 are separated by a distance of 20 mm. However, it should be noted in alternative embodiments, Array Sensor 420 and Lens 410 may not be positioned in parallel planes.

FIG. 4A illustrates the position of Lens 410 within an x-y plane when capturing a view of the upper left region of Area of Interest 300. FIG. 4B illustrates the position of Lens 410 within a x-y plane when capturing a view of the bottom right region of Area of Interest 300. Arrows 450 and 460 illustrate the direction in which Lens 410 may be shifted, which corresponds to movement along the x-axis and y-axis, respectively.

When scanning an Area of Interest 300 with a video camera, a first view (e.g., view 310) of Area 300 is recorded by positioning Lens 410 at a first position within a plane substantially orthogonal to an optical axis of Lens 410. Next, a second view (e.g., view 320) of Area 300 is recorded by positioning Lens 410 at a second position within the plane substantially orthogonal to the optical axis of Lens 410. A next view of Area 300 is recorded by positioning Lens 410 at a next position within the plane substantially orthogonal to the optical axis of Lens 410 until all views are recorded. All recorded views are combined to produce a composite image of Area 300, which has a higher resolution than the image of the individual views.

For an alternative embodiment of the present invention, a line-scan camera may be used to capture an image of an object. A line-scan camera includes a linear sensor such as a line-scan CCD. Available linear sensors have a high resolution in one dimension, but can be used to acquire a two-dimensional image if the lens is moved perpendicular to the linear sensor. Using exposures taken in succession, a two-dimensional image of the object is assembled.

Figure 6A:
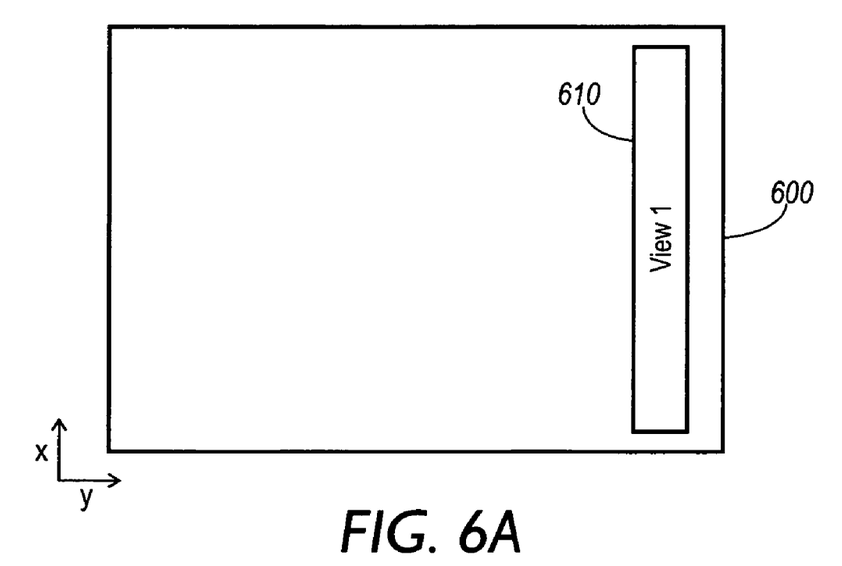
FIGS. 6A–B illustrate various views of an area of interest recorded visible to a line-scan camera.
Figure 6B:
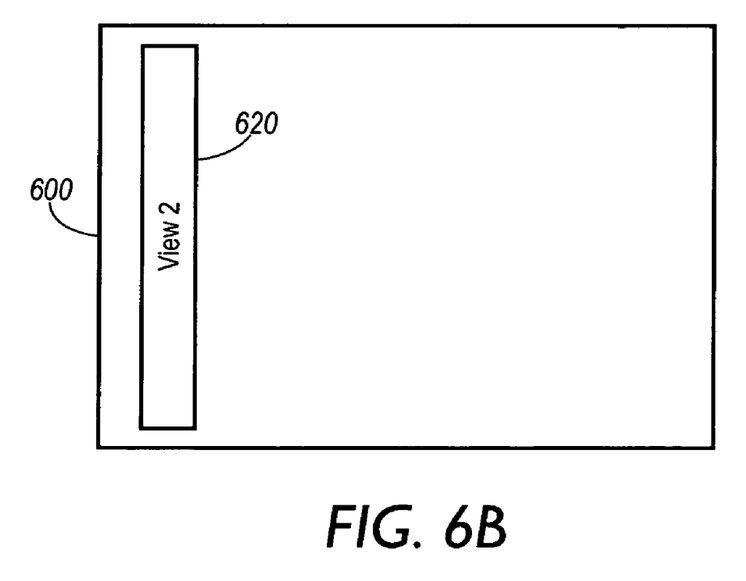

FIGS. 6A and 6B illustrate various views captured by a linear sensor with respect to an Area of Interest 600 according to one embodiment of the present invention. FIG. 6A illustrates a view (view 1) taken from the left side of Area of Interest 600 (while lens 710 is positioned at a first offset position) and FIG. 6B illustrates a view (view 2) taken from the right side of Area of Interest 600 (while lens 710 is positioned at a second offset position).

Figure 7A:
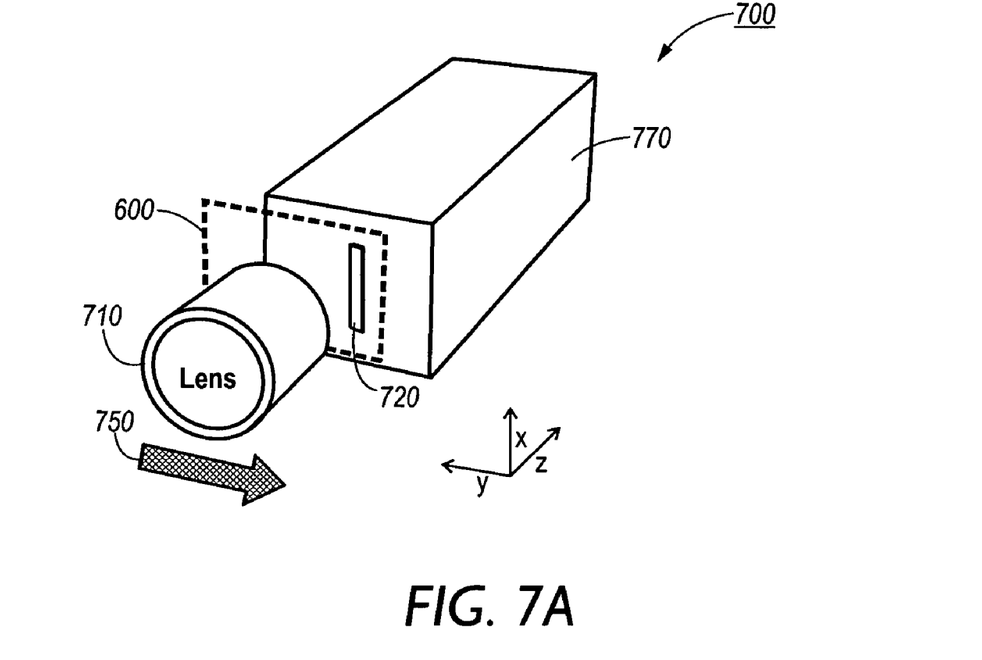
FIGS. 7A–B illustrate perspective views of a line-scan camera system according to one embodiment of the present invention positioned to record various views of an area of interest.
Figure 7B:
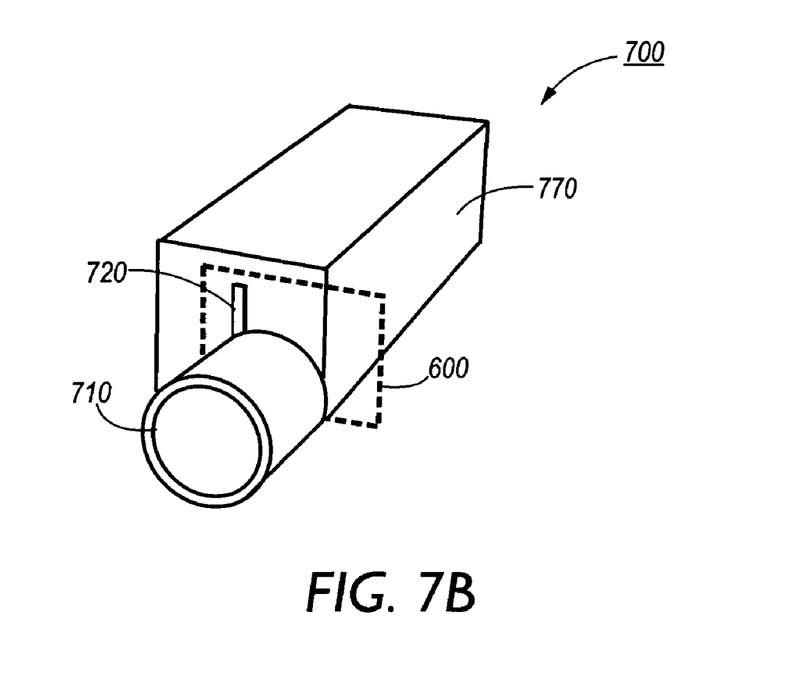

FIGS. 7A and 7B illustrate perspective views of a line-scan camera system 700 according to one embodiment of the present invention positioned to record various views of an area of interest. More specifically, FIGS. 7A and 7B illustrate the positioning of Lens 710 with respect to Linear Sensor 720 to capture views 610 and 620, respectively. Arrow 750 illustrates the direction in which Lens 710 is moved (i.e., along the y-axis), which is perpendicular to the Linear Sensor 720. Continuous movement of Lens 710 is controlled by a single-axis translation mechanism such as mechanism 900 shown in FIG. 9. For an alternative embodiment of the present invention, a dual axis translation mechanism may be used to move Lens 710 along two axes.

When scanning an Area of Interest 600 with a video camera, a first view (e.g., view 610) of Area 600 is recorded by positioning Lens 710 at a first position within a plane substantially orthogonal to an optical axis of Lens 710. Next, a second view (e.g., view 620) of Area 600 is recorded by positioning Lens 710 at a second position within the plane substantially orthogonal to the optical axis of Lens 710. A next view of Area 600 is recorded by positioning Lens 710 at a next position within the plane substantially orthogonal to the optical axis of Lens 710 until all views are recorded. All recorded views are combined to produce a composite image of Area 600, which has a higher resolution than the image of the individual views.

FIGS. 4A and 4B illustrate the manner in which Array Sensor 420 is enclosed by a Housing 470 of a video camera and FIGS. 7A and 7B illustrate the manner in which Linear Sensor 720 is enclosed by a Housing 770 of a line-scan camera. The expandability of the light shield allows the lens to be moved to any offset position within a given area so that camera images of varying degree of overlap can be obtained.

For one embodiment of the present invention, a light shield, such as a bellow made of a expandable material, is attached between the camera housing and optics as shown in FIGS. 5A and 5B and FIGS. 8A and 8B. The light shield prevents stray light from striking the image sensors such as Array Sensor 420 and Linear Sensor 720.

Figure 5:
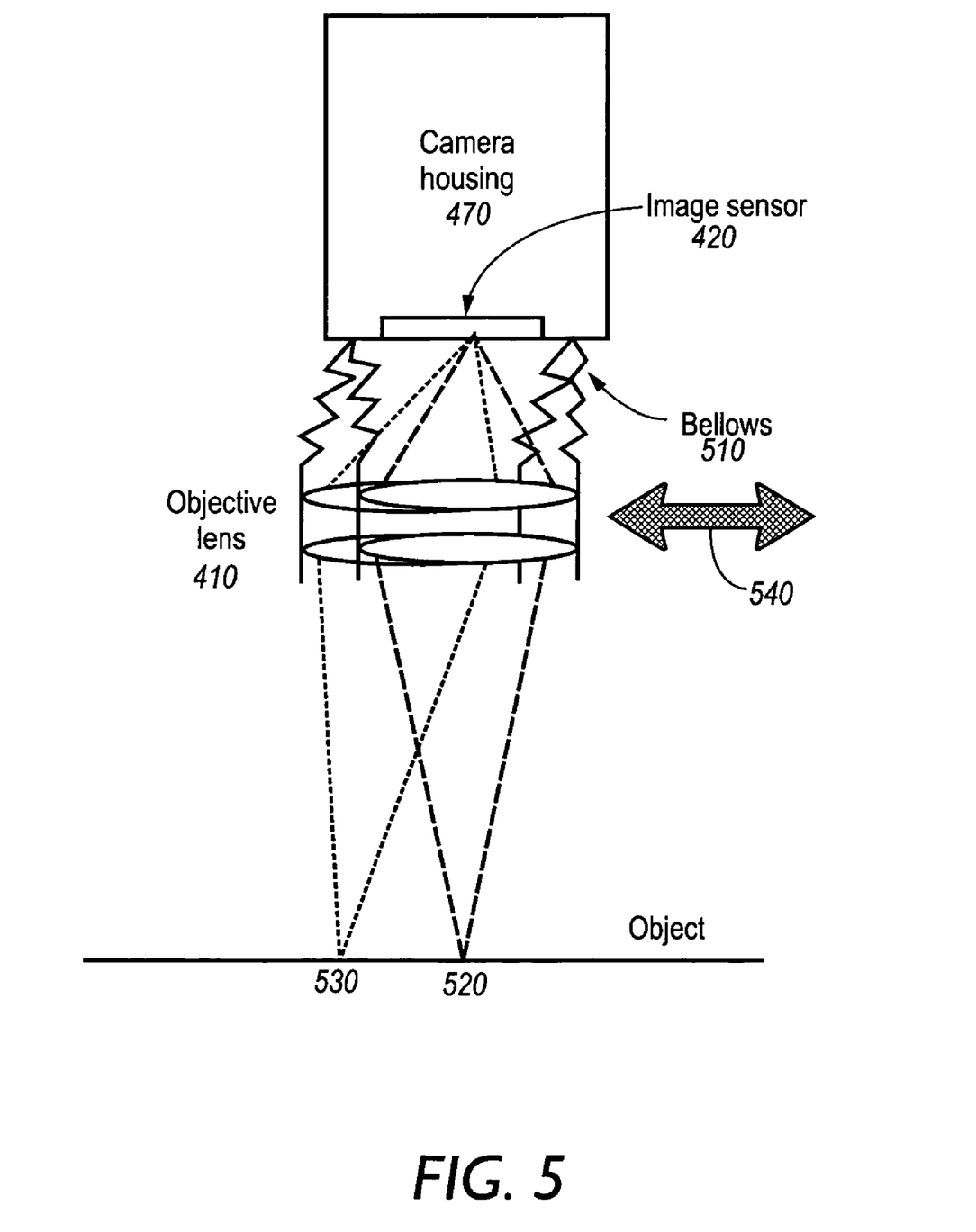
FIG. 5 illustrates a cross-sectional view of a video camera system with a light shield according to one embodiment of the present invention.

FIG. 5 illustrates Array Sensor 420, which is partially enclosed by housing 470. Attached to the outer perimeter of Lens 410 is one end of a Bellows 510. The other end of Bellows 510 is attached to Housing 470 exterior to Array Sensor 420. FIG. 5 illustrates the position of Lens 410 and Bellows 510 at a first position and indicates where an object point 520 is detected by Array Sensor 420. FIG. 5 also illustrates the position of Lens 420 and Bellows 510 at a second position and indicates where an object point 530 is detected by Array Sensor 420. Note that object point 530 is located slightly to the left of object point 520. Arrow 540 indicates the direction in which Lens 410 moves within a plane parallel to Image Sensor 420.

Figure 8:
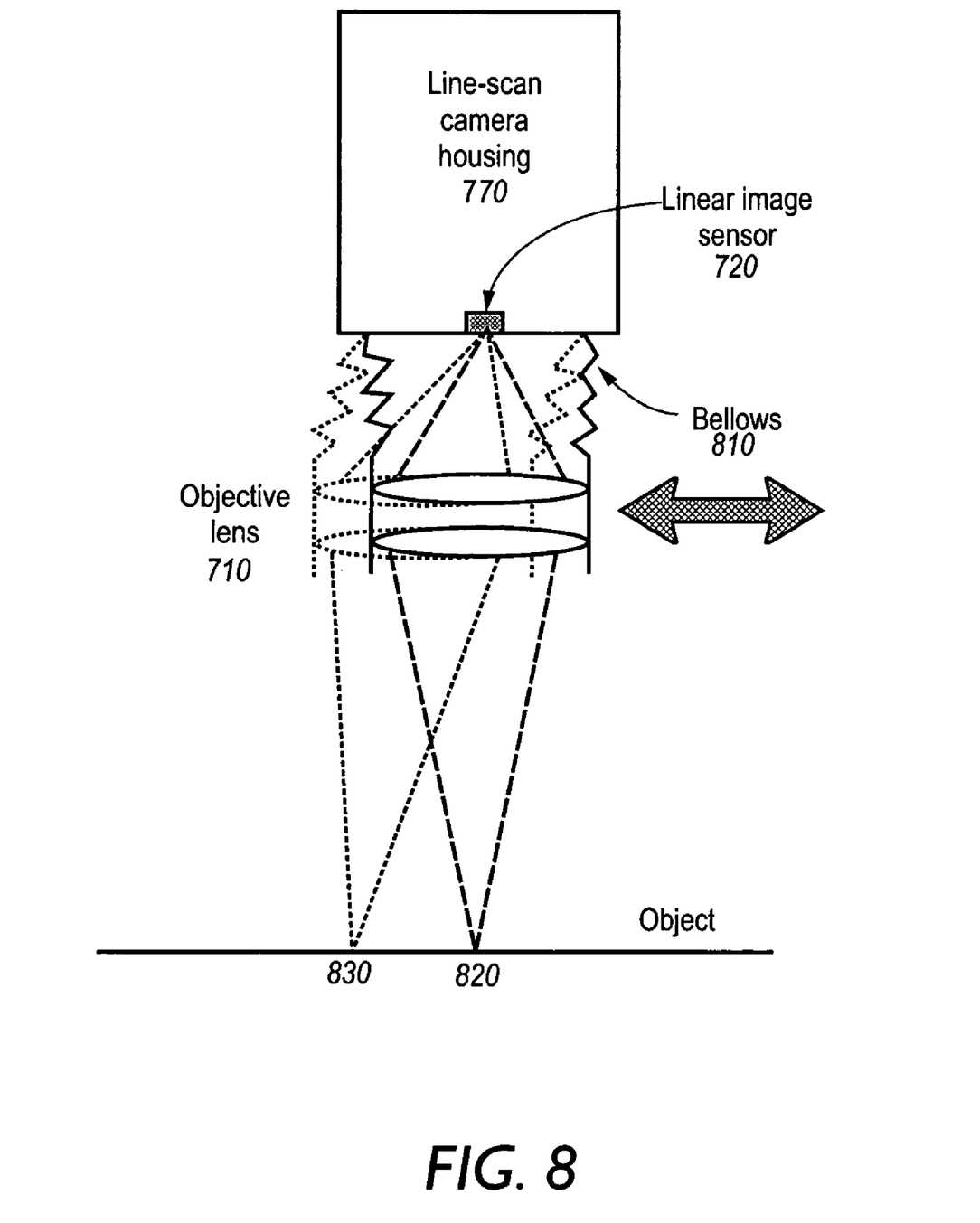
FIG. 8 illustrates a cross-sectional view of a line-scan camera system with a light shield according to one embodiment of the present invention.

FIG. 8 illustrate Linear Sensor 720, which is partially enclosed by housing 770. Attached to the outer perimeter of Lens 710 is one end of a Bellows 810. The other end of Bellows 810 is attached to Housing 770 exterior to Linear Sensor 720. FIG. 8 illustrates the position of Lens 710 and Bellows 810 at a first position and indicates where an object point 820 is detected by Linear Sensor 720. FIG. 8 illustrates the position of Lens 720 and Bellows 810 at a second position and indicates where an object point 830 is detected by Linear Sensor 720. Note that object point 830 is located slightly to the left of object point 820. Arrow 840 indicates the direction in which Lens 710 moves within a plane parallel to Image Sensor 720.

Translation Mechanism 900 shown in FIG. 9 illustrates one embodiment of a one-dimensional translation device used to move lens 910 along a single axis, such as the y-axis. Translation Mechanism 900 includes a Motor 920 coupled to a Lead Screw 930 and Linear Bearings 940. Linear Bearings 940 are used to constrain the motion of Lead Screw 930 along some line, such as the y-axis. Translation Mechanism 900 also includes a Motor 920 coupled to a Motor Driver Circuit 960. The Motor Driver Circuit 960 is coupled to Computer 980 (such as General Purpose Computer 210) via Serial or Parallel Interface 970. Computer 980 receives output data from the camera housed in Camera Housing 950. For one embodiment of the present invention, Translation Mechanism 900 is able to move a 35 mm SLR lens along one axis using a linear actuator. The motion is controlled via a computer and allows positioning to less than 0.5 mm.

It should be noted that a translation mechanism for two axes can be implemented by modifying Translation Mechanism 900 to translate in two directions.

Additionally, fixed lens shifts can be achieved by mounting the lens on a wheel with its axis parallel to, but not shifted relative to an optical axis of the lens. Alternatively, several lenses can be mounted in a filter wheel type arrangement so that each lens has a slight predetermined offset.

FIG. 10 illustrates a cross-sectional view of a Multiple Camera System 1000 positioned to view an Image Area of Interest 1020 according to one embodiment of the present invention. This embodiment is particularly well suited to view large image areas such as a newspaper column. Camera System 1000 includes four Cameras 1001, 1002, 1003, and 1004 for recording camera images. The camera images recorded by Cameras 1001–1004 are combined by mosaicing to obtain a composite image having a higher resolution. Rather than using a camera system having a single camera to obtain all camera images in a successive manner for mosaicing, multiple cameras may be used to record multiple camera images simultaneously.

Each of the Cameras 1001–1004 in Camera System 1000 is positioned and configured to view a portion of Image Area of Interest 1020, which is located on Surface 1010. For one embodiment of the present invention, Cameras 1001–1004 are housed together within a Housing 1040, which is supported by a Mount 1030 attached to Surface 1010. For over-the-desk video scanning solutions, Housing 1040 generally is attached to a desk-lamp like arm placed on the user's table or clamped to the side of the table, or fits under a bookshelf or is attached to a wall behind a desk.

More specifically, Camera 1001 is positioned to view area 1021, Camera 1002 is positioned to view Area 1022, Camera 1003 is positioned to view Area 1023, and Camera 1004 is positioned to view Area 1024. If Image Area of Interest 1020 is a newspaper column, then each of the Cameras 1001–1004 can capture regions of roughly a half-page size. It should be noted that Overlapping Regions 1050, 1055, and 1060 represent portions of Areas 1021–1024 that overlap with an adjacent Area 1021–1024.

FIG. 10 illustrates that the camera lens may be shifted or laterally displaced to view the appropriate region. For optimal results, the lens is shifted in a plane parallel to the plane of the image sensor. For one embodiment of the present invention, each of Lens 1011–1014 is a pair of achromatic lenses for minimizing both chromatic and spherical aberrations. More specifically, Lens 1011 is shifted to the left and Lens 1014 is shifted to the right, while Lens1012 and 1013 are not shifted. Thus, Cameras 1001 and 1004 view Areas 1021 and 1024, respectively, at oblique angles while Cameras 1002 and 1003 view Areas 1022 and 1023, respectively, directly above their field of view.

In general, the various camera Lens 1011–1014 are shifted by an offset. The offset is dependent upon the distance the lens is above area to be viewed, the distance of the lens from the sensor and the focal lengths of the lens. For one embodiment of the present invention, one or more of the cameras in a multiple camera system may have fixed lens offsets. For an alternative embodiment of the present invention, one or more of the cameras in the multiple camera system may have lens which may be shifted to a number of different offsets. If the lens can be shifted, then the lens will require a translation mechanism for shifting the lens and a movable light shield.

When scanning Image Area of Interest 1020 with Camera System 1000, a plurality of views (e.g., 1021, 1022, 1023, and 1024) are recorded with a plurality of cameras (e.g., 1001, 1002, 1003, and 1004). One or more of the cameras has an offset lens positioned within a plane substantially orthogonal to an optical axis of its lens. All recorded views are combined to produce a composite image of Area 1020. The composite image has a resolution higher than the images of the individual views.

Figure 11:
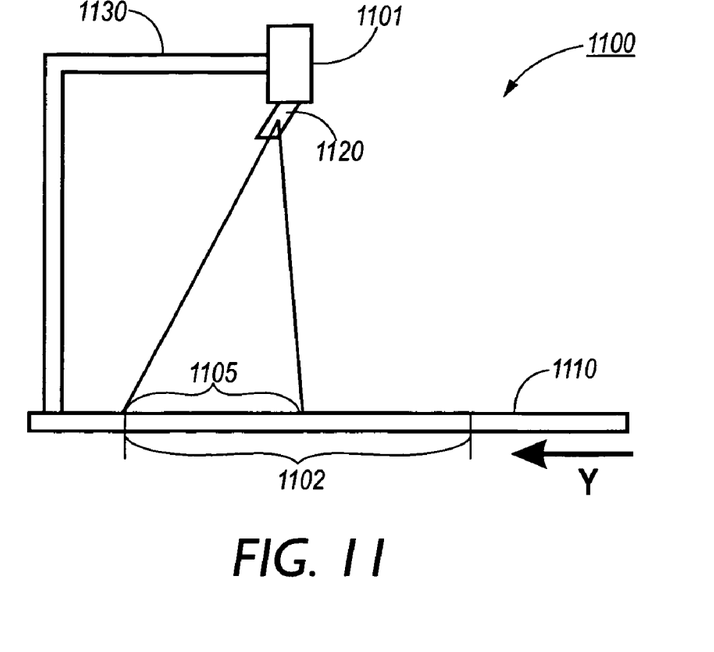
FIG. 11 illustrates a single camera system in a first position according to one embodiment of the present invention.
Figure 12:
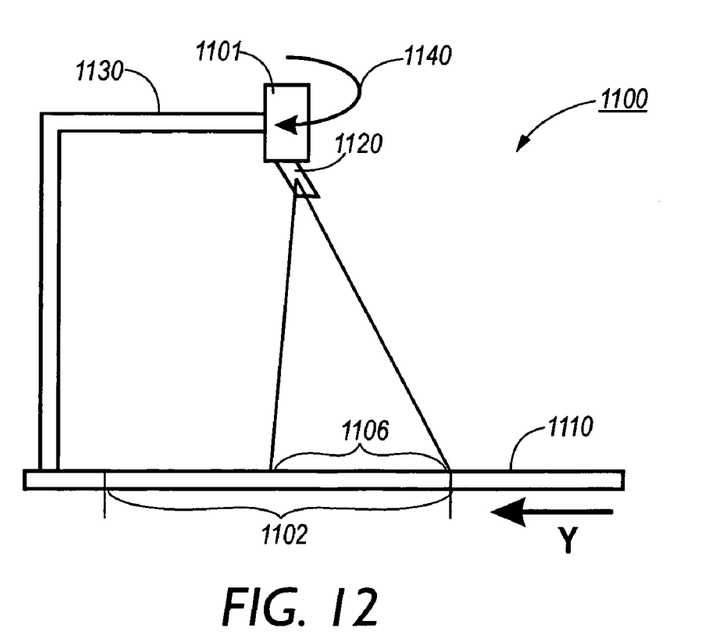
FIG. 12 illustrates the single camera system in a second position according to one embodiment of the present invention.

FIGS. 11 and 12 illustrate an alternative embodiment of a single Camera System 1100. For this embodiment, Lens 1120 remains at a fixed offset while obtaining camera images for mosaicing. Rather than changing the lens offset, Camera 1120 is rotated (e.g., 180 degrees) as shown by Arrow 1140. Camera 1101 is supported by a Mount 1130, which is attached to a Surface 1110. The Image Area of Interest 1102 is positioned on Surface 1110.

FIG. 11 illustrates Camera 1101 configured to view an Area 1105 of Area of Interest 1102. FIG. 12 illustrates Camera 1101 configured to view an Area 1106 of Image Area of Interest 1102. In FIG. 12, Camera 1101 has been rotated approximately 180 degrees from its position shown in FIG. 11. Thus, Areas 1105 and 1106 is viewed by Camera 1101 at oblique angles.

When scanning Area of Interest 1102 with Camera 1101, a first view (e.g., view 1105) is recorded while the lens is positioned at an offset position within a plane substantially orthogonal to an optical axis of the lens while the camera is at a first camera position. The Camera 1101 is rotated (e.g., 180 degrees) to a second camera position. A second view (e.g., 1106) is recorded while the lens is positioned at the same offset position within the same plane at the second camera position. The Camera 1101 is rotated again until all views are recorded. All recorded views are combined to produce a composite image of Area 1102, which has a resolution higher than images of the views.

Under certain circumstances it is desirable to scan documents at oblique angles. For example, when using an over-the-desk scanning system for document scanning, it is sometimes difficult for a camera to view an entire page in a bounded book or a fragile book. The binding of the book prevents the user from fully opening the book. For example, the bounded book may only open to about 60 degrees.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of scanning with a camera, comprising the steps of:
   (a) recording a first view of an area having one or more objects while a lens is positioned at a fixed offset position within a plane substantially orthogonal to an optical axis of the lens while the camera is at a first rotated position;
   (b) rotating the camera about an axis of rotation parallel to an optical axis of the lens from the first rotated position to a second rotated position;
   (c) recording a second view of the area while the lens is positioned at the fixed offset position within the plane after the camera is rotated to the second rotated position; and
   (d) combining all recorded views to produce a composite image having a higher resolution than the resolution of one or more of the recorded views by patching the views together at regions of overlap.

2. The method of claim 1, further comprising between step (c) and step (d), the steps of:
   (f) rotating the camera about the axis of rotation from the second rotated position to a third rotated position;
   (g) recording a next view of the area while the lens is positioned at the fixed offset position within the plane after the camera is rotated to a third rotated position.

3. The method of claim 2, further comprising the step of:
   (h) repeating steps (f) and (g) until all views of the area have been recorded.

4. The method of claim 1, wherein step (b) further comprises rotating the camera about the axis of rotation 180 degrees from the first rotated position to the second rotated position, and wherein step (c) further comprises the step of recording the second view of the area while the lens is positioned at the offset fixed position within the plane after the camera is rotated 180 degrees to the second rotated position.

5. An image acquisition system, comprising:
   a plurality of cameras simultaneously records a plurality of views of an area having one or more objects to produce a plurality of camera images of different portions of the area, each camera having a lens positioned within a plane substantially orthogonal to an optical axis of the lens, wherein the view of each camera is positioned to record a portion of the area with at least one of the cameras having an offset lens to produce an oblique field of view of the portion it records of the area, and wherein the offset lens of the at least one camera may be shifted to one of a plurality of offsets; and
   an image processing system coupled to the plurality of cameras and operable to combine the plurality of camera images simultaneously recorded to produce a composite image having a higher resolution than the resolution of one or more of the simultaneously recorded views of the area;
   wherein at least a second of the plurality of cameras has a fixed offset lens to produce an oblique field of view.

6. The image acquisition system of claim 5, wherein at least one camera with no lens offset is interposed between the cameras recording oblique fields of view.

7. A method of scanning with a camera system having a plurality of cameras, comprising the steps of:
   (a) simultaneously recording a plurality of views of an area having one or more objects with a plurality of cameras to produce a plurality of camera images of different portions of the area, each camera having a lens positioned within a plane substantially orthogonal to an optical axis of the lens, wherein the view of each camera is positioned to record a portion of the area with at least one of the cameras having an offset lens to produce an oblique field of view of the portion it records of the area, and wherein the offset lens of the at least one camera may be shifted to one of a plurality of offsets; and (b) combining the plurality of simultaneously recorded camera images to produce a composite image having a higher resolution than the resolution of one or more of the simultaneously recorded views of the area;

wherein at least a second of the plurality of cameras has a fixed offset lens to produce an oblique field of view.

8. The method of claim 7, wherein at least one camera with no lens offset is interposed between the cameras recording oblique fields of view.

9. An image acquisition system, comprising:

a plurality of cameras simultaneously records a plurality of views of an area having one or more objects to produce a plurality of camera images of different portions of the area, each camera having a lens positioned within a plane substantially orthogonal to an optical axis of the lens, wherein the view of each camera is positioned to record a portion of the area with at least one of the cameras having an offset lens to produce an oblique field of view of the portion it records of the area, and wherein the offset lens of the at least one camera may be shifted to one of a plurality of offsets; and an image processing system coupled to the plurality of cameras and operable to combine the plurality of camera images simultaneously recorded to produce a composite image having a higher resolution than the resolution of one or more of the simultaneously recorded views of the area by patching the views together at regions of overlap;

wherein at least a second of the plurality of cameras has a fixed offset lens to produce an oblique field of view.

10. The image acquisition system of claim 9, wherein at least one camera with no lens offset is interposed between the cameras recording oblique fields of view.

11. A method of scanning with a camera system having a plurality of cameras, comprising the steps of:

(a) simultaneously recording a plurality of views of an area having one or more objects with a plurality of cameras to produce a plurality of camera images of different portions of the area, each camera having a lens positioned within a plane substantially orthogonal to an optical axis of the lens, wherein the view of each camera is positioned to record a portion of the area with at least one of the cameras having an offset lens to produce an oblique field of view of the portion it records of the area, and wherein the offset lens of the at least one camera may be shifted to one of a plurality of offsets; and (b) combining the plurality of simultaneously recorded camera images to produce a composite image having a higher resolution than the resolution of one or more of the simultaneously recorded views of the area by patching the views together at regions of overlap;

wherein at least a second of the plurality of cameras has a fixed offset lens to produce an oblique field of view.

12. The method of claim 11, wherein at least one camera with no lens offset is interposed between the cameras recording oblique fields of view.

* * * * *